US008713010B1

(12) United States Patent   (10) Patent No.: US 8,713,010 B1
Trevelyan   (45) Date of Patent: Apr. 29, 2014

(54) PROCESSOR ENGINE, INTEGRATED CIRCUIT AND METHOD THEREFOR

(71) Applicant: Robert Trevelyan, Hampshire (GB)

(72) Inventor: Robert Trevelyan, Hampshire (GB)

(73) Assignee: Luxian Limited, London (GB)

( * ) Notice: Subject to any disclaimer, the term of this patent is extended or adjusted under 35 U.S.C. 154(b) by 0 days.

(21) Appl. No.: 13/770,878

(22) Filed: Feb. 19, 2013

(51) Int. Cl.
  *G06F 17/30* (2006.01)
(52) U.S. Cl.
  USPC ..... 707/735; 707/748; 707/708; 707/E17.108
(58) Field of Classification Search
  None
  See application file for complete search history.

(56) References Cited

U.S. PATENT DOCUMENTS

| | | | |
|---|---|---|---|
| 8,135,615 B2 | 3/2012 | Bradley et al. | 705/14 |
| 8,312,015 B1 | 11/2012 | Trevelyan | 707/735 |
| 2003/0018468 A1 | 1/2003 | Johnson et al. | 704/8 |
| 2003/0158960 A1 | 8/2003 | Engberg | 709/237 |
| 2005/0125374 A1 | 6/2005 | Curtis et al. | 707/1 |
| 2005/0176500 A1 | 8/2005 | Mathews et al. | 463/29 |
| 2006/0004633 A1 | 1/2006 | Ashbaugh | 705/14 |
| 2006/0224593 A1 | 10/2006 | Benton et al. | 707/10 |
| 2007/0061211 A1 | 3/2007 | Ramer et al. | 705/25 |
| 2007/0143283 A1* | 6/2007 | Spencer et al. | 707/5 |
| 2007/0244883 A1 | 10/2007 | Bessieres et al. | 707/5 |
| 2007/0255821 A1 | 11/2007 | Ge et al. | 709/224 |
| 2008/0313144 A1 | 12/2008 | Huston | 707/3 |
| 2009/0006985 A1 | 1/2009 | Fong et al. | 715/760 |
| 2009/0150345 A1 | 6/2009 | Van Luchene | 707/3 |
| 2009/0150372 A1 | 6/2009 | Batista Reyes et al. | 707/5 |
| 2009/0171943 A1 | 7/2009 | Majumder et al. | 707/5 |
| 2011/0016104 A1 | 1/2011 | Leconte | 707/706 |
| 2011/0219295 A1 | 9/2011 | Adams et al. | 715/234 |
| 2011/0264498 A1 | 10/2011 | Grant et al. | 705/14.17 |
| 2013/0218859 A1 | 8/2013 | Trevelyan | 707/706 |
| 2013/0219281 A1 | 8/2013 | Trevelyan | 715/738 |

FOREIGN PATENT DOCUMENTS

| | | |
|---|---|---|
| WO | WO 2013/121032 | 8/2013 |
| WO | WO 2013/121037 | 8/2013 |

OTHER PUBLICATIONS

International Search Report for International Application No. PCT/EP2013/053146, mailed Jun. 14, 2013, 4 pages.
International Search Report for International Application No. PCT/EP2013/053160, mailed Jun. 11, 2013, 4 pages.
Esrun,"Cheating Alexa—Increasing Alexa ranking automatically," Nov. 1, 2010, pp. 1-7, URL:http://web.archive.org/web/20101106095338/http://www.esrun.co.uk/blog/cheating-alexa-increasing-alexa-ranking-automatically/,[retrieved on May 30, 2013].

(Continued)

*Primary Examiner* — Anteneh Girma
(74) *Attorney, Agent, or Firm* — Pillsbury Winthrop Shaw Pittman LLP

(57) ABSTRACT

A processor engine for affecting at least one authorized website's position on at least one Internet search engine's page ranking is described. The processor engine comprises at least one processor arranged to: identify a target list comprising at least one authorized website that is to be promoted; open a web browser; access an internet search engine on the first web browser; load at least a part of at least one search term into the internet search engine running on the web browser; associate at least the part of the at least one search term with the at least one authorized website on the target list; close the web browser, and repeat a plurality of times, the operations of open, access, load, associate, and close, thereby affecting the at least one authorized website's position on the internet search engine's page ranking.

18 Claims, 7 Drawing Sheets

(56) References Cited

OTHER PUBLICATIONS

Asribudi, "Fake Hits! Alexa Booster, Increase Your Search Engine Rank," Nov. 26, 2004, pp. 1-4, URL:http://www.moneymakergroup.com/Fake-Hits-Alexa-Booster-13034.html, [retrieved on May 30, 2013].

Asktroyg, "How People Cheat Google Adsense," Nov. 4, 2009, pp. 1-2, URL:http://asktroyg.hubpages.com/hub/How-People-Cheat-Google-Adsense, [retrieved on May 30, 2013].

Duhan, et al., "Page Ranking Algorithms: A Survey," Advance Computing Conference 2009, IACC 2009. IEEE International, Piscataway, NJ, USA., Mar. 6, 2009, pp. 1530-1537.

\* cited by examiner

PROCESSOR ENGINE, INTEGRATED CIRCUIT AND METHOD THEREFOR

FIELD OF THE INVENTION

The field of this invention relates to a processor engine, an integrated circuit and a method therefor. The invention is applicable to, but not limited to, a processor engine, an integrated circuit and a method for automatically promoting a web-site in a search process.

BACKGROUND OF THE INVENTION

It is known that a significant amount of unauthorised material may be found on the Internet, which often causes damage to the reputation of, for example, an individual, company, brand or product. Content found on the Internet can often be unauthorised, stolen or misappropriated, degrading, illegal, malicious, damaging, libellous, hurtful, defamatory, outdated or suspended, fraudulent, extrajudicial, thereby bestowing a complete misrepresentation of the individual, company, brand or product.

Once a new website has been created, or content/material has been posted on an existing website, a search engine may regularly visit this site and index its content and make this new content/material searchable from a web search engine. A web search engine makes no allowance for the fact the content/material uploaded to a website is true or damaging or illegal. Consequently, the web search engine just indexes the content/material and makes it searchable for any future user who types in a word or phrase associated with the website the content/material is present on.

An example of this potential problem that may be caused to an individual, company, brand or product would be if unauthorised material (e.g. photos, video, music, etc.) was uploaded to a social network website, or any other type of website. Within a short period of time, this material could go 'viral' and, thus, be available to be downloaded by anyone searching for it. If an individual felt that the material was damaging, hurtful or included family members, for example, who did not want to be in the public eye, the individual could ask to have the material removed. This is common practice and would require some form of legal action against the hosting websites. In most instances, reasonable websites will take the material down promptly.

However, a potential problem with such unreasonable, damaging content/material may be that in some cases the content/material could have been moved to jurisdictions where it is more difficult to have it removed.

Therefore, a need exists to provide protection for individuals, companies, products, and the like, in order to limit any damage created through, for example, unauthorised material on the Internet.

Search engine optimization (SEO) is the process of improving a visibility of a website or a web page in search engines via 'natural' (without a tariff being imposed) search results. Such natural search results are often referred to as 'organic' or 'algorithmic' search results. In general, the earlier (or higher ranked on the search results page) and more frequently that a site appears in a search result list, the more visitors it will receive from the search engine's users. Page rankings are largely based on the degree of surfer interest and traffic flow, page impressions, freshness, search term density, links in and out, frequency of updates, age of page and other factors.

One disadvantage of generic SEO is that it relies on the search engine robots 'finding' the websites, indexing them and then positioning them on the search engine page ranking. Typical search engine optimisation (SEO) focuses on creation and manipulation of content to existing or new websites, both overtly and covertly. These changes make the website more visible to the search engine robots and, therefore, they are indexed with specific keywords associated with the website. It is known that SEO may target different kinds of search, including image search, local search, video search, academic search, news search and industry-specific vertical search engines.

As an Internet marketing strategy, SEO considers how search engines work, what people search for, the actual search terms typed into search engines and which search engines are preferred by their targeted audience.

As effective SEO schemes may require changes to the HTML source code of a site and site content, SEO tactics may be incorporated into website development and design. Optimizing a website to improve its rating on website searching typically involves editing its content and hyper-text mark-up language (HTML) and associated coding to both increase its relevance to specific keywords and to remove barriers to the indexing activities of search engines. The term 'search engine friendly' is also often used to describe website designs, content management systems, videos, images, shopping carts, and other elements that have been optimized for the purpose of search engine exposure.

In some scenarios, the acronym 'SFOs' may also refer to 'search engine optimizers', a term adopted by an industry of consultants who carry out optimization projects on behalf of clients, and by employees who perform SEO services in-house. Search engine optimizers may offer SEO as a stand-alone service or as a part of a broader marketing campaign.

Most users of search engines cease reviewing web-site content at the first or second page. One recent tactic for the use of SFOs is website promotion, in order to bring more visitors to specific websites. In recent years, website promotion, say through SEO, has also been used in the area of on-line product promotion, for example to promote new or existing products and to improve product exposure of a particular product in a country, region or on a specific search engine. Alternative techniques to SEO are also used for website promotion, such as web content development and search engine submission, in order to increase (search) traffic to a site.

One problem with SEO, for example in the context of website promotion, is that SEO requires access to each and every website in order for certain names, terms or expressions to be promoted. Thus, access to each of these websites is required in order to make and enforce the necessary/desired website changes.

Thus, a need exists for at least an apparatus (such as a processor engine/integrated circuit) and method promoting a web-site in a search process, and in particular for a scalable computer-implemented method of affecting a website's (URL) position on a search engine(s) page ranking.

It is also known that the Internet is a very dynamic tool, and that certain words or phrases can become popular relatively quickly. Popularity of certain words or phrases can be known as 'trending' on social network or other websites. Search engines are able to use these 'trends' and provide prompts for what may be currently the most popular search terms. An example of this would be to use a search engine and start typing the word "OLYMPICS". In this example, as the first two characters are typed, a prompt may be created for the most popular search terms prefixed with OL. In this example, Olympics is the third prompt, second to pop stars and celebrities who are currently (today) searched for more than the Olympics.

Therefore, a need also exists to be able to influence an association created between search terms and the website(s) visited.

SUMMARY OF THE INVENTION

Accordingly, the invention seeks to mitigate, alleviate or eliminate one or more of the above mentioned disadvantages, either singly or in any combination. Aspects of the invention provide a processor engine, integrated circuit, and a method therefor, as described in the appended claims.

According to a first aspect of the invention, there is provided a a processor engine for affecting at least one authorised website's position on at least one Internet search engine's page ranking is described. The processor engine comprises at least one processor arranged to: identify a target list comprising at least one authorised website that is to be promoted; open a web browser; access an internet search engine on the web browser; load at least a part of at least one search term into the internet search engine running on the web browser; associate at least the part of the at least one search term with the at least one authorised website on the target list; close the web browser, and repeat a plurality of times, the operations of open, access, load, associate, and close, thereby affecting the at least one authorised website's position on the internet search engine's page ranking.

In this manner, no subsequent human intervention is required to affect the website's position on the at least one Internet search engine's page ranking. Furthermore, in this manner, by accessing the identified at least one website a plurality of times, flexibility may be provided to enable a decision to be made as to how far up the at least one Internet search engine's page ranking the desired website may appear, for example within the first page or the first two pages. In some examples, the processor may be arranged to intermittently visit the Internet search engine and determine the current page ranking of the desired website in order to identify whether a desired page ranking has been achieved, and if not repeat the process a number of times. In some examples, once a desired page ranking has been achieved, the at least one processor may transition to another search term, a different language of the same search term, a different Internet search engine, another website from the target list, etc., in order to further promote the, or another, website.

According to an optional feature, the at least one processor may be further arranged to read the target list and access at least one further website from one or more remaining, or each of the, read websites to be promoted, identify at least one website search hit that matches the at least one further website; decide whether or not to create a search engine generated link; and access the identified at least one further website a plurality of times, thereby affecting the at least one further website's position on the Internet search engine's page ranking. In this manner, a variable and independently set number of websites can be manipulated such that they appear in a particular order on the Internet search engine's page ranking.

According to an optional feature, the at least one search term may comprise one from a group comprising: an user-defined search term, a pre-defined search term, a word, a plurality of words, a phrase. In this manner, the process for affecting a website's position on at least one Internet search engine's page ranking can be dictated by, say, a user. Alternatively, a company's profile or a celebrity's profile may be improved by using, say, a pre-defined search term of the company's name or a person's name.

According to an optional feature, the at least one processor may be arranged to create a substantially unique, anonymous connection to the Internet (noting that it is 'substantially unique' as there is a finite amount of IP addresses available). In this manner, the Internet search engine may not be able to recognise the originating (source) IP address and may only be able to see the IP address provided by, say, the anonymous web proxy application.

According to an optional feature, the at least one processor may be arranged to access the identified at least one website a plurality of times, by creating a plurality of further connections to the Internet. In some optional examples, a plurality of further connections to the Internet may use at least one different source internet protocol (IP) address. In some optional examples, the at least one different source internet protocol (IP) address may comprise a source IP address from a different country. In this manner, the at least one processor may be able to hide or disguise the intention to affect a website's (URL) position on a search engine's page ranking due to the switching between a plurality of Internet connections.

According to an optional feature, the at least one processor may be arranged to request a further search of the at least one search term on the at least one Internet search engine using a different language of the at least one search term. In this manner, the process for affecting a website's position on at least one Internet search engine's page ranking may be re-applied across multiple regions, countries and/or continents.

According to an optional feature, the at least one processor may be further arranged to write a log entry into a log file that contains information on at least one from a group comprising: date of searching the at least one website, date of loading the at least one search term; date of access the at least one website, time of searching the at least one website; the at least one search term, the at least one target list, at least one source internet protocol (IP) address used. In this manner, a mechanism for tracking searches and results may be made, for example to subsequently fine-tune any respective process.

According to an optional feature, the at least one processor may be confined to perform a search within a specified, region, country or continent. In this manner, a mechanism for targeting searches and affecting country-specific page ranking values may be employed, for example to influence any country-specific perception of the desired website.

According to an optional feature, any website traffic reporting software installed on the target websites may report back to one or more search engine(s) its statistics and therefore affect the ranking of the website. A website that is visited regularly from different countries, using, say, different IP addresses and using, say, different web browsers, which is then navigated for a varying duration of times using different or the same website links, will rate higher than a site that is not visited.

According to an optional feature, the at least one processor may be further arranged to navigate around the identified at least one website, before exiting, for at least one from a group comprising: a set period of time, a random period of time, a search-term dependent period of time. In this manner, a mechanism for making the process more flexible is provided. Furthermore, introducing a random time period for navigation around the website further makes the process difficult to detect and recognise that it is a repeated process by the Internet search engine.

According to an optional feature, the processor engine may comprise a user interface, for example a graphical web browser or a non-graphical text-based web browser, operably coupled to the at least one processor to facilitate loading at least one from a group comprising: the at least one search term into the program running on the at least one processor; the target list comprising at least one website that is to be promoted. In this manner, a user-friendly process/mechanism for affecting a website's page ranking in an Internet search engine is provided.

According to an optional feature, the processor engine may decide whether or not to modify the content of at least one of the website(s) defined in the target list.

According to an optional feature, the processor engine may decide to generate and write at least one log entry to at least one log file. This log entry may include information on one or more of a date, time, at least one search term, at least one target list, at least one generated link, at least one source IP address, and/or information on whether the content of the at least one website was modified. The information stored on the at least one log file may be used, for example, for management reporting and/or analysis.

According to a second aspect of the invention, there is provided an integrated circuit for affecting a website's position on at least one Internet search engine's page ranking. The integrated circuit comprises at least one processor. The at least one processor is arranged to: identify a target list comprising at least one authorised website that is to be promoted; open a web browser; access an internet search engine on the web browser; load at least a part of at least one search term into the internet search engine running on the web browser; associate at least the part of the at least one search term with the at least one authorised website on the target list; close the web browser, and repeat a plurality of times, the operations of open, access, load, associate, and close, thereby affecting the at least one authorised website's position on the internet search engine's page ranking.

According to an optional feature, the processor engine may decide whether or not to modify the content of at least one of the website(s) defined in the target list.

According to an optional feature, the processor engine may decide to generate and write at least one log entry to at least one log file. This log entry may include information on one or more of a date, time, at least one search term, at least one target list, at least one generated link, at least one source IP address, and/or information on whether the content of the at least one website was modified. The information stored on the at least one log file may be used, for example, for management reporting and/or analysis.

According to a third aspect of the invention, there is provided method for affecting a website's position on a search engine's page ranking. The method comprises, at a processor: identifying a target list comprising at least one authorised website that is to be promoted; opening a web browser; accessing an internet search engine on the web browser; loading at least a part of at least one search term into the internet search engine running on the web browser; associating at least the part of the at least one search term with the at least one authorised website on the target list; close the web browser, and repeating a plurality of times, the operations of opening, accessing, loading, associating, and closing, thereby affecting the at least one authorised website's position on the internet search engine's page ranking.

According to a fourth aspect of the invention, there is provided a tangible computer program product having executable program code stored therein for affecting a website's position on at least one Internet search engine's page ranking, the program code operable for, when executed at a processor, performing the method according to the third aspect of the invention.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1:
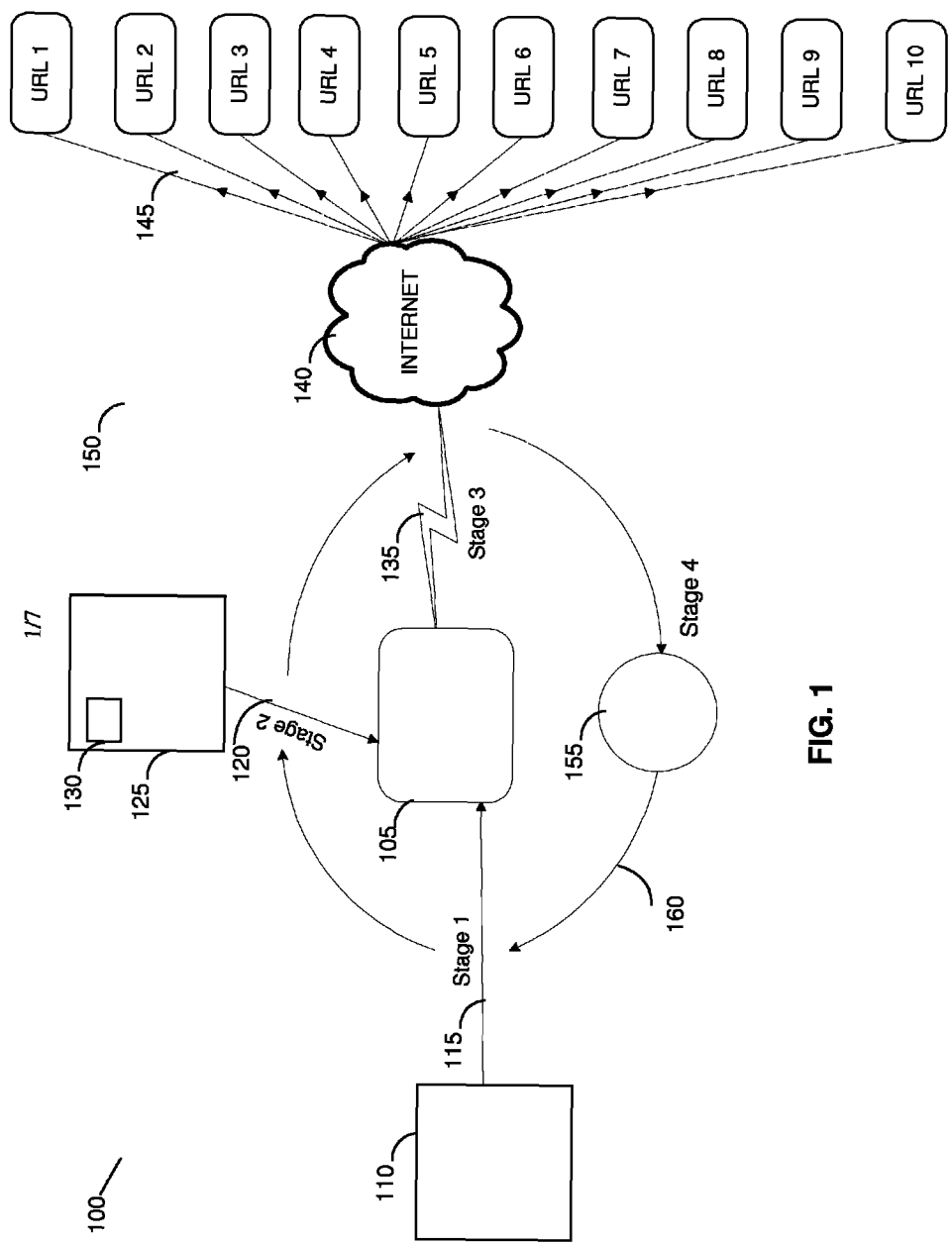
FIG. 1 illustrates an example of part of a processor-based (computer) system.

Some examples of the invention will be described in terms of computer program that performs a scalable computer-implemented method of affecting a website's (e.g. URL) position on a search engine's page ranking. Content and/or material found on the Internet can often be unauthorised, stolen or misappropriated, degrading, illegal, malicious, damaging, libelous, hurtful, defamatory, outdated or suspended, fraudulent, extrajudicial and on the whole a complete misrepresentation of a person, company, product or brand. Known web search engines fail to make any allowance for the fact the content/material uploaded to a website is true or damaging or illegal, as the search engine(s) just index(es) the content and/or material and make it searchable for any future user who types in a word or phrase associated with the website the material is present on.

In accordance with an example of the invention, a processor engine for affecting at least one authorised website's position on at least one Internet search engine's page ranking is described. The processor engine comprises at least one processor arranged to: identify a target list comprising at least one authorised website that is to be promoted; open a web browser; access an internet search engine on the first web browser; load at least a part of at least one search term into the internet search engine running on the web browser; associate at least the part of the at least one search term with the at least one authorised website on the target list; close the web browser, and repeat a plurality of times, the operations of open, access, load, associate, and close, thereby affecting the at least one authorised website's position on the internet search engine's page ranking.

Thus, in this manner, the current invention attempts to bring a balance to web search engines and allow individuals and companies the ability to make more visible authorised material. In particular, examples of the invention may merely scan pre-existing information and re-order the information, such that page rankings may be re-ordered whilst leaving content intact or by changing the content, as deemed necessary. Favourable and/or more balanced web sites may then be manipulated to displace and rank higher than negative sites and/or less balanced web sites.

In this manner, a website to be promoted may be associated with relevant search terms, and those search terms, if transmitted to a search engine, may increase the visibility of the desired website on one or more search engines, thereby affecting the website's page ranking.

In some examples, a user specified word, words or phrase may be provided to at least one search engine, for example by at least one processor in a processor engine. The at least one processor may use the search engine to perform a search of the user specified word, words or phrase. From the list of search hits provided by the search engine, the at least one processor may only select the 'hits', say from a target list, which may be also defined by the user. The search terms may be associated with unauthorised material previously posted on an internet website, for example, to which a search engine (s) may provide a link when specific terms are entered. Aspects of the invention may use the same search terms and search engine, and may associate them with authorised material hosted on an authorised website(s). In some examples, the at least one processor may then access the one or more website, multiple times. The process of performing this associates the user specified word, words or phrase with at least one desired website, and therefore may increase the at least one website's page rank and visibility using the selected search terms within the selected search engine. Thereby, increasing the user-selected website's visibility to users of the search engine(s), and providing, for example, an association between the search terms and the 'authorised' material hosted on an authorised website.

In this manner, the at least one processor in a processor engine may enable a user to specify any user specified search term in the form of a word, words or phrase, and provide these via, say, a web browser to at least one Internet search engine and perform a search. Then, for example using a list of user-specified/preferred websites, the at least one processor in a processor engine may be arranged to only select the websites of interest from the search engine 'hits'. Then, for example the at least one processor in a processor engine may decide to create or not create a search engine generated link and use this link to access the user-specified/preferred website(s). In subsequently accessing these websites, an association between the search terms and the websites may be created and/or the website(s) page ranking on the Internet search engine may be affected. In some examples of the present invention, the at least one processor in a processor engine may be arranged to access the website and automatically navigate around the website for a period of time, in order to register 'sufficient' activity/interest in the web-site according to any Internet search engine rules, before the program exits. The at least one processor in a processor engine may then select a new IP address, for example from a different country, and in some examples perhaps using the search terms in a different language and repeats the process.

In some examples, the at least one processor in a processor engine may decide whether or not to modify the content of at least one of the user-specified/preferred website(s).

In some examples, the at least one processor in a processor engine may decide to generate and write a log entry, for example, to a log file, which may contain information on one or more of the date, time, at least one search terms, at least one target list, at least one generated link, at least one source IP address, and information on whether the content of the at least one website was modified.

In some examples, information stored on the at least one log file may be used, for example, for management reporting and/or analysis.

In some examples, aspects of the invention may affect at least one search term that would have ordinarily been used to locate unauthorised content/material by associating the at least one search term with actual authorised content/material, which may be hosted on an 'authorised' website. An effect of this may be that any user seeking to find unauthorised content/material using the at least one search term would search and only find authorised material.

In some examples, the unauthorised and authorised content/material may relate to, for example, individuals, companies, products, brands, and the like.

In some examples, aspects of the invention may alter Internet search engine rankings of specific unauthorised content/material posted on web pages by boosting the ranking of specific legitimate material.

In some examples, aspects of the invention may affect an association between search terms and website(s) visited, in order to form a 'trending' event that may affect search engine prompting.

In some examples, an advantage over the current known method of associating search terms with a website and then promoting that website is that the present invention does not require access to, and/or changes made to, the existing website. However, in other examples, if such access was provided, the present invention may make changes to the website content/material as deemed necessary. Furthermore, some examples of the present invention require no relationship with the website to be promoted, which can be advantageously provided in any location, in any country, on the Internet.

In some examples, the invention may be performed in hardware or firmware. In some examples, a processor or processor-based system with an Internet connection capability may provide a substantially anonymous automatic method to influence search terms to a search engine(s) and adapt the specific search hits returned, in order to select specific websites/URLs. The substantially anonymous automatic method (and apparatus therefor) may therefore influence a user to visit these websites/URLs, therefore promoting the selected websites/URLs.

In this manner, increasing the page ranking on a search engine(s) of authorised material on an authorised website(s), utilising aspects of the invention, users may be allowed to view the authorised material, and, therefore, may direct them to visit this material, rather than unauthorised material on an unauthorised website(s).

Furthermore, some examples of the invention do not require the content of the websites to be promoted to be dynamic or updated regularly. For example, embodiments of the invention enable processing of both new content and pre-existing content, e.g. a marketing company generating a new product article as well as traffic to a relevant products on a pre-existing website(s) that may have been, say, pushed back to page 10 of a page ranking due to there being no/few visits for a long period of time. Thus, traffic may be generated to both the new site and the old pre-existing site using the specified search terms and both promoted. Hence, some examples of the invention may therefore satisfy the present demand for re-ordering search engine page rankings, whilst leaving the content of a website intact. Some examples of the invention may achieve this benefit by merely scanning pre-existing information and re-ordering it. In this manner, the present invention may be able to promote any website, located anywhere in the world, and make it more visible by increasing its search engine ranking. No access or relationship with the website is required in order to promote its ranking higher in a ranking list. One consequence of this may be a new or existing product or service could be associated with the specified search terms and those search terms be associated by the search engine with the desired web site. In this manner, examples of the present invention may also be used as a product or service promotion tool.

In some examples, the processor engine or processor-based system (such as a computer system) may run at least an equivalent of an Intel™ Pentium™ based processor or equivalent, preferably with a memory capacity of, say, 1 Gbyte and hard drive capacity of 10 Gbyte. In some examples, the processor engine may utilise a keyboard and/or mouse. The computer or processor engine requires a network connection to the Internet. In some examples, the processor engine may be remotely controlled, for example through a web-interface, etc. from any suitable electronic device, e.g. from a dummy PC. In this example, the processor engine may not necessarily require direct connection with a keyboard and/or mouse.

In some examples of the present invention, the computer or processor engine may employ a version or derivative of the Linux Operating System. However, in other examples, the invention may be performed using substantially any other present day Operating System.

In some examples of the present invention, an Internet web browser may be installed along with an anonymous web proxy application and browser specific plugin. The anonymous proxy application software may be installed in the processor engine and, in some examples in conjunction with a browser plugin as an optional extra to the browser. In some examples, the anonymous proxy application software creates an anonymous relay or circuit to the Internet and to the desired search engine or target website. This circuit may be at a network routing level to facilitate the Internet connection, and thus not at a graphical level. In some examples, the browser plugin enables the web browser, either via a graphical or text version, to utilise this anonymous circuit using, say, hyper-text transfer protocol (HTTP) etc., and to provide the facility to turn 'on' or 'off' the anonymous function for the browser's use.

In some examples of the present invention, the processor engine may be able to associate specified search terms and website(s)/URLs on one or more search engine(s) and then select only specific website(s)/URLs from the resultant search hits, thereby increasing the visibility of the specified website(s)/URLs on search engine page ranking.

In some examples, the processor(s) may be programmed to automatically wait a random period of time, select a different source IP address, exit the program and thereafter repeat the process.

In some examples, a user may be able to specify a selection of Internet search engine(s) and/or search terms, to be used, which could be the word(s) or phrase that will be entered into a search engine. In some examples, a user is also able to specify a selection of website(s) that are to be promoted, in a form of a target list, which will be the website(s) whose promotion in the search engines' ranking is desired.

Referring now to FIG. 1, an example of part of a processor-based (computer) system 100 is illustrated. A processor engine 105 is arranged to receive (in communication 115) one or more search criteria from a client search request/client input 110. Such a communication 115 may be performed locally or remotely with a wired or wireless connection to/from the processor engine 105. The processor engine 105 may comprise at least one processor (not shown), which is/are arranged to load the at least one search term into a program running on the at least one processor. In addition, a target list 125, comprising for example one or more target website(s) 130 (e.g. designated by uniform resource locators (URLs)) are loaded 120 into the processor engine 105. The processor may then load the target list 125 comprising at least one website 130 that is to be promoted. The processor engine 105 creates an Internet connection and accesses 135 the Internet 140, and in some examples, accesses at least one Internet search engine therein. From there, the processor engine 105 is able to access 145 a number (and potentially a very large number) of website(s)/URLs 150 related to the search terms/criteria. The processor is further arranged to request a search of the at least one search term on the at least one Internet search engine and identify at least one website search hit that matches at least one website on the target list 125. In some examples, the identification of at least one website search hit that matches at least one website on the target list 125 may include at least one website that protects or enhances a product or services of an individual or company. As such, by targeting website(s) that protect(s) or enhance(s) a product or service of an individual or company, that product or service will be more visible on an internet search engine for the specified search terms and may be more readily seen from an Internet user accessing information on that individual or company. As such, by associating a specified word, words or phrase with a website on an Internet search engine, any product or service offered by the company or individual will be more visible to an Internet user.

Additionally and advantageously, in some examples, the processor engine 105 may be configured to cause the Internet search engine to create a LINK to the desired website that is to be promoted, or not to generate a link and go direct to the desired website to be promoted, as the processor engine 105 does not rely on any specific Internet search engine. In this example, the processor engine 105 may have the capability to generate a link and go to the desired website via the Internet search engine or not generate a link and go to the desired website to be promoted direct. This function can be determined on demand or randomly. This provides the processor engine 105 with the ability to simulate any user accessing any number of Internet search engines.

Further, in some examples, the processor engine 105 may be configured to modify content of the website to be promoted. The website to be promoted may have been accessed directly by the processor engine 105, or via a link generated by the Internet search engine. This function may be determined, for example, on demand or in a random manner.

In some further examples, the processor engine 105 may be configured to generate and write a log entry to a log file, for example, containing information on one or more of the date, time, at least one search terms, at least one target list, at least one generated link, at least one source IP address, and information on whether the content of the at least one website was modified. The information stored on the at least one log file may be used, for example, for management reporting and/or analysis.

The processor may be further arranged to access the identified at least one website a plurality of times, thereby affecting the at least one website's position on the Internet search engine's page ranking. In some examples, the processor may be arranged to navigate around the website for a period of time 155. The period of time 155 may be a set period of time or a random period of time, so long as it is sufficient to register the processor's access of the website as being one of interest, thereby making it difficult for the Internet search engine to detect that the access was an automated process or one focused on raising the visibility of the website by affecting the websites page ranking on the Internet search engine.

Thereafter, the processor may be arranged to access the identified at least one website a plurality of times, by repeating the process 160. In some examples, the processor may create a plurality of further connections to the Internet. In some examples, a plurality of further connections to the Internet may use at least one different source internet protocol (IP) address. In some examples, the at least one different source internet protocol (IP) address may comprise a source IP address from a different country. In this manner, the at least one processor may be able to hide or disguise the intention to affect a website's (URL) position on a search engine's page ranking due to the switching between a plurality of Internet connections.

In some examples of the invention, the processor engine 105 may be configured to support language-specific searches. For example, should the processor engine 105 identify the country associated with an IP address (preferably an anonymous IP address) that it has been assigned, the processor engine 105 may automatically change the browser settings to use the same country specific language in order to perform any on-going search(s) and/or website(s) browsing. Thus, and advantageously, this feature may be implemented within the processor engine 105 regardless of where in the world the processor engine 105 is located. In one example, the processor engine 105 may detect, say, a German IP address and could change the browser settings to use the German language. Thereafter, the processor engine 105 may be configured to use a German language search engine in order to perform any search(s) and access any website(s) matches.

Furthermore, in some examples, the processor engine 105 may perform country-specific searches. In this example, the processor engine 105 may be configured to perform all searches and website visits within one or more specified countries, regions or continents. In some examples, the processor engine 105 may be configured to use only anonymous IP addresses that have been assigned to a specific country. Thereafter, the processor engine 105 may be configured to automatically change the browser settings to use the same country specific language and to perform all searches only on search engines within that country, and/or only access one or more website(s) within that country. Thus, and advantageously, this feature may be implemented within the processor engine 105 regardless of where in the world the processor engine 105 is located. In one example, the processor engine 105 may be configured to operate only, say, within France. In one example, the processor engine 105 may be configured to detect only French anonymous IP addresses and then change the browser to use French language. The processor engine 105 may then use a French language search engine to perform any search(s) and access any website(s) matches, whilst staying within the boundaries of France. Thus, the processor engine 105 can simulate, say, a French user in Paris searching for restaurants and the results returned by the Internet search engine provide only restaurants in Paris, i.e. local, and the desired website to be promoted may appear and be more visible to an Internet user than possibly other restaurants.

Additionally and advantageously, in some examples, the processor engine 105 may be configured to perform browser switching, as the processor engine 105 does not rely on any specific web browser. In this example, the processor engine 105 may have the capability to switch its browser make, version and/or language on demand or randomly. This provides the processor engine 105 with the ability to simulate any user or country specific profile.

Furthermore, in some examples, the processor engine 105 may be configured to perform website navigation. In this example, the processor engine 105 may be configured to perform the search in the normal manner, but when the processor engine 105 accesses the one or more identified website (s) (e.g. as specified in the target list), the processor engine 105 is configured to automatically navigate through a portion or the entire website, selecting, say, some or all specified links, e.g. for a set or random period of time.

Figure 2:
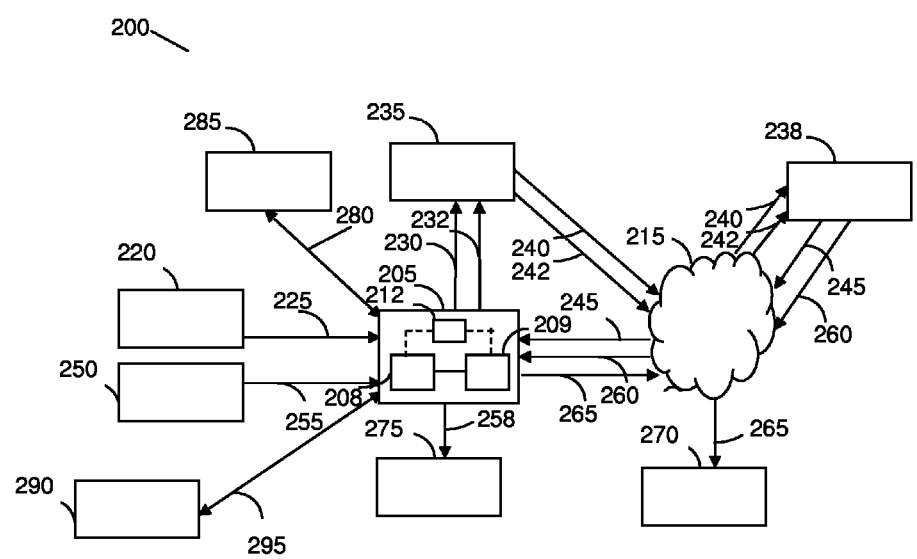
FIG. 2 illustrates a more detailed example block diagram of a processor engine within a processor-based (computer) system.

Referring now to FIG. 2, a more detailed example block diagram of a processor engine within a processor-based (computer) system 200 is illustrated. In some examples of the present invention, a processor engine 205 comprises one or more processors 208, 209, which may be configured to affect a website's (URL) position on a search engine's page ranking by running, for example, a software program from the operating system. In some examples, an operating system may load a program into a computer memory. In some examples, the processor engine 205 may be arranged to create a substantially anonymous connection to the Internet 215. In some examples, one or more search terms may be read 225 from a search list 220 and loaded into the program in computer memory. In some examples, these search terms may be of a form of a word, words or phrase. In one example, an Internet web browser 235 is started 230 and the program ensures that the processor (or computer) connects 240 to an Internet search engine 238 (or number of search engines) of interest.

In some examples, user-defined search terms may be provided, say via the web browser 235, to the Internet search engine (or number of search engines) and a search requested. The resultant search 'hits' are routed to the processor engine 205 by the search engine(s) 238 and, in some examples, displayed/read. In 255, the program loads one or more website(s) and a target list 250 that is to be associated with the search terms and that are to be promoted. Thereafter, the program reads or extracts those one or more website(s) from the list of search 'hits' 260 provided by the search engine(s) 238, e.g. the 'hits', that match those provided by the target list. The processor engine 205 then reads the target list provided in 250 and accesses 265 one or more of the remaining, or each of the, websites 270.

In communication 258, a log entry may be written to a log file 275 by the program performed on the one or more processor(s) 208, 209, whereby the log file may contain information about, say, date and time, the search terms and target list and the source IP address used. In some examples, this information may be used for management reporting and analysis. The program may determine whether to navigate to the next website 270. In this manner, the program is able to transition through each of the websites defined by the target list 250. In some examples, this successive transitioning between websites may be continued for a fixed time, say controlled by timer 212. In some examples, this successive transitioning between websites may be continued for a random period of time, thereby making it more difficult for the Internet search engine to detect the website as having been accessed by the same processor engine 205 (or processor 208, 209) multiple times.

If no more of the identified websites 270 to be accessed exist, the program may exit, close the web browser and the anonymous Internet connection. The process may then restart from 205. For example, the at least one processor 208, 209 may be arranged to access the identified at least one website a plurality of times, by creating a plurality of further connections to the Internet.

In some optional examples, a plurality of further connections to the Internet may use at least one different source internet protocol (IP) address. This provides the processor engine 205 with the ability to 'simulate' (inasmuch as it is recognised by an internet search engine) a plurality of individual users clicking on an internet link. In some optional examples, the at least one different source internet protocol (IP) address may comprise a source IP address from a different country. In this manner, the at least one processor may be able to hide or disguise the intention to affect a website's (URL) position on a search engine's page ranking due to the switching between a plurality of Internet connections.

In some examples, a communications interface to the one or more processor(s) 208, 209 is provided, and may comprise an SEO portal 285, which may be an Internet facing secure portal used for access to the processor engine 205. In some examples, the SEO portal 285 may allow configuration of new search terms and website(s) to be visited/accessed. In this manner, any Search Engine Optimisation (SEO) user or company may be provided with the capability to manage a number of processor engines 205 or servers, as defined, say, by their respective license agreement. In some examples, the SEO portal may provide any system administrator/user with the capability to manage any number of processor engines 205 or processors 208, 209, located anywhere in the world and permit configuration of these to perform searches and website visits/accesses. A subset of the statistics and management information relating to the SEO may also be available to view, export and print via link 280. Although in the illustrated example the SEO portal is shown distal from the processor engine 205, in some examples, the SEO portal 285 may reside within the processor engine 205.

In some examples, a communications controller (not shown) may also be coupled to application modules 290 or software programs to allow various users (e.g. companies or individuals) access 295 to the processor engine 205 via any suitable means.

Figure 3:
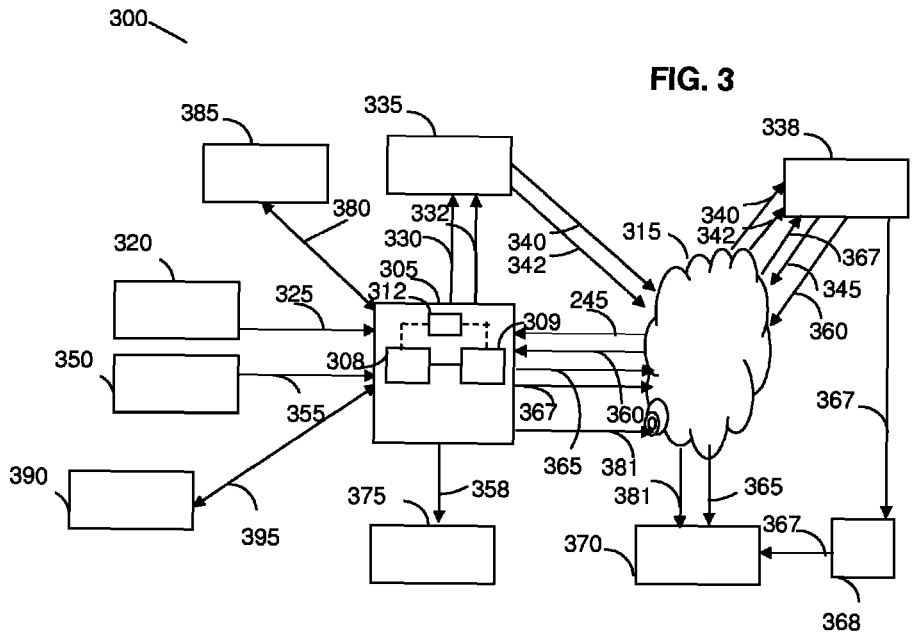
FIG. 3 illustrates a further more detailed example block diagram of a processor engine within a processor-based (computer) system.

Referring to FIG. 3, a more detailed example block diagram of a processor engine within a processor-based (e.g. computer) system 300 is illustrated. In some examples of the present invention, a processor engine 305 may comprise one or more processors 308, 309, which may be configured to affect a website's (URL) position on a search engine's page ranking by running, for example, a software program from the operating system. In some examples, an operating system may load a program into a computer memory. In some examples, the processor engine 305 may be arranged to create a substantially anonymous connection to the Internet 315. In some examples, one or more search terms may be read 325 from a search list 320 and loaded into the program in computer memory. In some examples, these search terms may be of a form of a word, words or phrase. In one example, an Internet web browser 335 is started 330 and the program ensures that the processor (or computer) connects 340 to an Internet search engine 338 (or number of search engines) of interest.

In some examples, user-defined search terms may be provided, say, via the web browser 335, to the Internet search engine (or number of search engines) and a search requested. The resultant search 'hits' are routed to the processor engine 305 by the search engine(s) 338 and, in some examples, displayed/read. In 355, the program loads one or more website(s) and a target list 350 that is to be associated with the search terms and that are to be promoted. Thereafter, the program reads or extracts those one or more website(s) from the list of search 'hits' 360 provided by the search engine(s) 338, e.g. the 'hits', that match those provided by the target list. The processor engine 305 then reads the target list provided in 350.

In some examples, the processor engine 305 may decide to generate 367 a link 368 through the internet search engine 338, rather than accessing 365 one or more of the remaining, or each of the, websites 370 directly. If the processor engine 305 does decide to generate 367 a link 368 using the internet search engine 338, the processor engine 305 may read the link 368 and use it to access 367 one or more of the remaining, or each of the, websites 370.

In other examples, the processor engine 305 may decide not to generate 367 a link 368 through the internet search engine 338. In this example, the processor engine 305 may access the one or more of the remaining, or each of the, websites 370 directly.

In some examples, the processor engine 305 may decide to modify content 381 of the one or more of the remaining, or each of the, websites 370, In examples, the decision to modify content 381 of the one or more of the remaining, or each of the, websites 370 may be determined by the target list 350. In some examples, the modification of an existing website may be performed by automatically identifying 'trending' search terms that are currently being used on a web search engine, in order to find unauthorised or illegal content; and with the permission of the target website owner or administrator 'inject' or modify these search terms into the target websites content thereby providing the association of unauthorised or illegal search terms with an authorised and legal website content. The automated and repetitive nature of this causes the effect of 'trending' search terms or 'prompts' on a web search engine to eventually associate unauthorised or illegal search terms with authorised and legal content.

In some circumstances, where an authorised target website cannot be modified in this way, example embodiments of the present invention may be configured to create sufficient website content to build a complete website including the unauthorised or illegal search terms but populate the website with authorised and legal content.

In other examples, the processor engine 305 may decide not to modify content 381 of the one or more of the remaining, or each of the, websites 370.

The content to be modified may comprise any content/material of a website 370 to be modified. For example, text, HTML code, XHTML code, videos, audio, internet links, mark-up anchors, page information, header information, primary navigation information (e.g. menus), secondary navigation (e.g. sidebar links), primary content area, secondary content area, footers, database information or the like. In some examples, the content may also be related to illegal or unauthorised content, such as material associated with pirated or stolen films, movies and TV shows. This illegal or stolen material may also be related to software applications or programs. This illegal or stolen material is often in the form of a Peer-to-Peer (P2P) 'Torrent' or Magnet' file, which is regularly used to direct a user, using specific software for this task, to link to and download segments of stolen, screen captured illegal film, movie or TV show content from multiple online users (hence the term 'peer-to-peer'. This enables the user to then re-create the illegal content of this illegal or stolen pirated film, movie, TV show on their computer. Using example embodiments of the present invention, one or more word(s) or phrase search term(s) associated with illegal or unauthorised films, movies or TV shows, which would typically direct a user to torrent and magnet files, can be associated with authorised and legal content or an authorised website advising that the material being searched for is illegal or not currently available. Thus, example embodiments of the present invention may mask torrent and magnet files or point to a legal video file that downloads an authorised movie, or points the viewer to a short movie clip advising against movie piracy, such as the Federation Against Copyright Theft (FACT). In this manner, a user searches for illegal content, finds it, downloads it and receives a warning that it's illegal, thereby reducing movie piracy. In a similar manner, some example embodiments may reduce the proliferation of stolen or illegal software, again distributed by P2P.

In communication 358, a log entry may be written to a log file 375 by the program performed on the one or more processor(s) 308, 309, whereby the log file may contain information about, say, date and time, the search terms and target list and the source IP address used. In some examples, this information may be used for management reporting and analysis. The program may determine whether to navigate to the next website 370. In this manner, the program is able to transition through each of the websites defined by the target list 350. In some examples, this successive transitioning between websites may be continued for a fixed time, say controlled by timer 312. In some examples, this successive transitioning between websites may be continued for a random period of time, thereby making it more difficult for the Internet search engine to detect the website as having been accessed by the same processor engine 305 (or processor 308, 309) multiple times.

In some examples, the log file 375 may further contain information about, say, generated link 368. In some examples, the log file 375 may further contain information indicating if one or more of the remaining, or each of the, websites 370 has had content that was modified.

If no more of the identified websites 370 to be accessed exist, the program may exit, close the web browser and the anonymous Internet connection. The process may then restart from 305. For example, the at least one processor 308, 309 may be arranged to access the identified at least one website a plurality of times, by creating a plurality of further connections to the Internet.

In some examples, the program may navigate through each of the identified websites 370 for a random period of time, the identified websites may be determined from the target list 350.

In some optional examples, a plurality of further connections to the Internet may use at least one different source internet protocol (IP) address. This provides the processor engine 305 with the ability to 'simulate' (inasmuch as it is recognised by an internet search engine) a plurality of individual users clicking on an internet link. In some optional examples, the at least one different source internet protocol (IP) address may comprise a source IP address from a different country. In this manner, the at least one processor may be able to hide or disguise the intention to affect a website's (URL) position on a search engine's page ranking due to the switching between a plurality of Internet connections.

In some examples, a communications interface to the one or more processor(s) 308, 309 is provided, and may comprise an SEO portal 385, which may be an Internet facing secure portal used for access to the processor engine 305. In some examples, the SEO portal 385 may allow configuration of new search terms and website(s) to be visited/accessed. In this manner, any Search Engine Optimisation (SEO) user or company may be provided with the capability to manage a number of processor engines 305 or servers, as defined, say, by their respective license agreement. In some examples, the SEO portal may provide any system administrator/user with the capability to manage any number of processor engines 205 or processors 308, 309, located anywhere in the world and permit configuration of these to perform searches and website visits/accesses. A subset of the statistics and management information relating to the SEO may also be available to view, export and print via link 380. Although in the illustrated example the SEO portal is shown distal from the processor engine 305, in some examples, the SEO portal 385 may reside within the processor engine 305.

In some examples, a communications controller (not shown) may also be coupled to application modules 390 or software programs to allow various users (e.g. companies or individuals) access 395 to the processor engine 305 via any suitable means.

Figure 4:
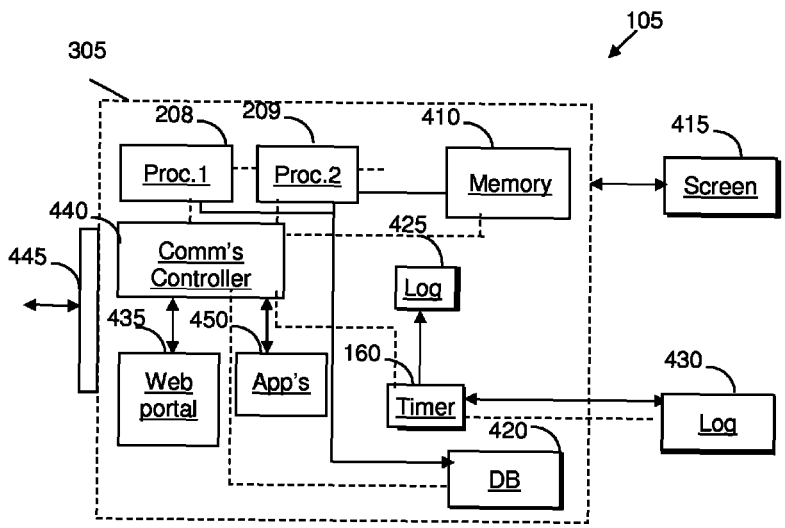
FIG. 4 illustrates a simplified block diagram of the processor engine.

Referring now to FIG. 4, a simplified block diagram of the processor engine 105 is illustrated. In this example, the processor engine 105 comprises a plurality of processors, with only two processors 208, 209 shown for clarity purposes only. The processor engine 105 further comprises a memory 410, which in some examples is used for storing search terms, language-specific data, country-specific data, web-browser related data, Internet search engine related data, etc. The processor engine 105 further comprises a communications controller 440, operably coupled to a web portal 435, which in some examples is used for remote access of the processor engine 105. In some examples, the communications controller 440 is operably coupled to communications interface 445, for interfacing with the Internet, and in some examples an Internet search engine.

The processor engine 105 further comprises a user interface 415, which may comprise a touch screen and/or keyboard, and/or mouse, etc. for interfacing with a user. In some examples, user interface 415 may comprise an administrator control panel, which provides an Internet facing secure portal that may be used for access to the processor engine 105 to allow configuration of new search terms and website(s) to be visited/accessed. In some examples, the administrator control panel may provide any system administrator/user with the capability to manage any number of processor engines 105 or processors 208, 209 located anywhere in the world and permit configuration of these to perform searches and website visits/accesses. All statistics and management information will also be available to view, export and print.

In some examples, user interface 415 may comprise a user Portal, which may be an Internet facing secure portal to be used for access to the processor engine 105 to allow an end user to view any progress and page ranking of their particular search term(s) and website(s). This user Portal may also provide the user or company with a capability to view user specific statistics and management information, which may also be available to view, export and print The processor engine 105 further comprises a timer module 160, operably coupled to an internal data log module 425 and/or an external data log module 430, which in some examples is used as a reporting tool for activities performed by the processor engine 105.

In some examples, the data log module 425, 430 may be used to gather statistics and management information as well as to generate, say monthly or on-demand reports that can be provided to users/clients. In some examples, the statistics and management information may be constructed from one or more of the following: the search terms(s) used, website(s) visited, time and date of a website access, one or more source IP address(es) used, country(/ies) visited from, language(s) used, browser(s) used, and the number of total visits within a period of, say, one month, or as defined, and the page rank of the website(s) of interest per search engine.

In this example, the processor engine 105 comprises an integrated circuit 405 that may be located in a computer-system or processing-based system. In other examples, the integrated circuit may solely comprise the processor engine 105, or one or more of the processors 208, 209, with other components provided in distinct circuits or further integrated circuits or memory ICs, etc.

In some examples, the communications controller 440 may also be coupled to application modules 450 or software programs. In one example, the application module(s) 450 may comprise a smartphone Administrator App, which may be used as a smartphone application in order to provide access to the processor engine 105 to allow configuration of new search terms and website(s) to be visited/accessed. In some examples, the application modules 450 may provide any system administrator or user the capability to manage any number of processor engines 105 or servers located anywhere in the world and permit configuration of these to perform searches and website visits. All statistics and management information will also be available to view.

In one example, the application module(s) 450 may comprise a smartphone SEO App, which may be used for access to the processor engine 105 to allow configuration of new search terms and website(s) to be visited. The smartphone SEO App may provide any Search Engine Optimisation (SEO) user or company the capability to manage a number of processor engines 105 or servers, as defined by their respective license agreement. Advantageously, the smartphone SEO App may be located anywhere in the world and permit configuration of program variables in order to perform searches and access one or more websites. A subset of the statistics and management information relating the SEO may also be available to view.

In one example, the application module(s) 450 may comprise a smartphone User App, which may be used for access to the processor engine 105 to allow an end user to see progress and page ranking of their particular search term(s) and website(s). The smartphone User App may provide the user or company the capability to view user specific statistics and management information, which may also be available to view, export and print.

In some examples, the processor engine 105 may be configured to support website detection and cloning. In this example, the processor engine 105 may be configured to not only automatically search for specified keyword(s) and then visit/access a predefined or search engine result website(s) with a view to promotion of the website(s), but the processor engine 105 may visit/access these website(s) to create an actual copy of all websites visited. In this regard, the processor engine 105 may be configured to perform a recursive 'HTTP GET' operation, which in essence means that the processor engine 105 visits a website and follows every link on the website, saves each and every link and copies and saves every picture and document. The processor engine 105 may then create a local folder (directory) on the initiating machine and copy the saved files in a way that a user is able to go to the folder, open the index.html (first page) and view the site (off-line) as if was the original website, but where no internet connection is required. Freely available versions of a product that supports website cloning exist, and are incorporated herein by reference, including HTTRACK or Website Extractor. In this example, the processor engine 105 has the capability to make an entire copy of any website containing these search terms. For example the processor engine 105 may be configured to monitor for the existence of certain intellectual property or sensitive information that should not exist on the Internet, but if detected automatically makes a clone of any websites found for subsequent investigation/analysis.

In some examples of the present invention, the processor engine 105 may be configured to work with an installed Internet web browser and/or with an anonymous web proxy application and browser specific plugin. In this regard, the processor engine 105 may utilise many websites all over the world that offer free and open (un-authenticated) re-routing of HTTP requests. This means that a user's web browser uses some software installed on their computer that allows connections to one of these anonymous web proxy applications that, in effect, act as 'relays'. The relay then connects to the target website, thus hiding the originating user's source IP address. Once the software has been installed on the user's computer the 'anonymous relay' function can be turned 'on' or 'off' by clicking on a software switch that uses a browser plugin in order to use (or not use) the 'anonymous' option in the web proxy applications. Commercial applications that offer this functionality include PROXIFY and A4PROXY, the general teaching of which is incorporated herein by reference.

In some examples of the present invention, the processor engine 105 may be configured to create a connection to the Internet that is substantially unique (noting that there is a finite amount of IP addresses available) and anonymous. In this manner, the Internet search engine may not be able to recognise the originating (source) IP address and may only be able to see the IP address provided by the anonymous web proxy application. In this manner, any processor or processor engine or computer running software according to the claimed invention may connect to the internet using different anonymous proxies going to the same search engine or website and even though the originating IP address is the same the search engine or website believes it to be different every visit In some optional examples, such anonymous IP addresses are used randomly so that no footprint from a single IP address is left.

Figure 5:
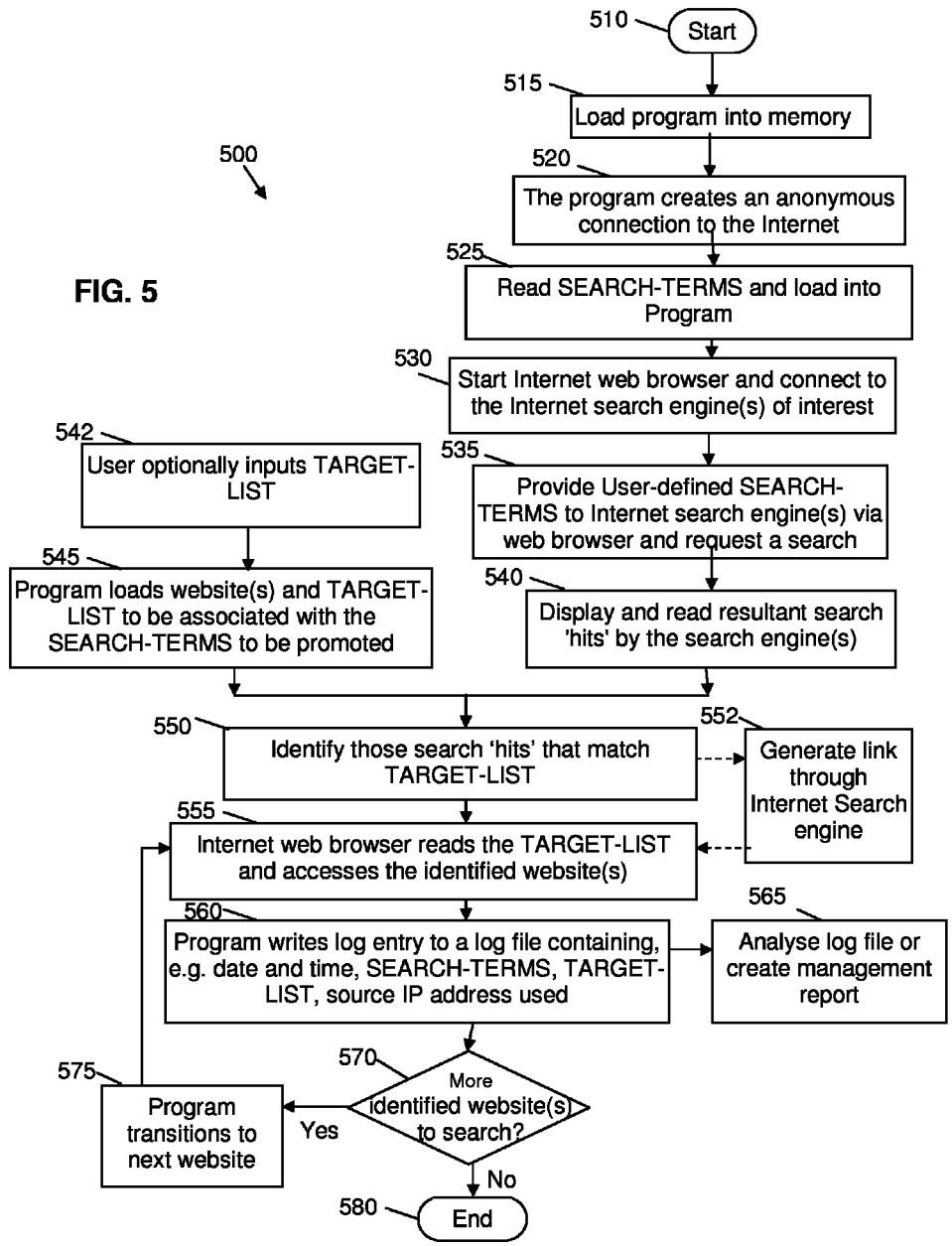
FIG. 5 illustrates a simplified flowchart of a method for affecting a website's (URL) position on a search engine's page ranking within a processor-based (computer) system.

In some examples of the present invention, as illustrated in the flowchart 500 of FIG. 5, a method for affecting a website's (URL) position on a search engine's page ranking is initiated by running, for example, a software program from the operating system. The method commences in 510, and in 515 the operating system loads a program into a computer memory. In 520, a program stored in a processor is arranged to create a substantially anonymous connection to the Internet. In this context, a processor or processor engine 'simulates' (inasmuch as it is recognised by an internet search engine) a new individual user clicking on an internet link, using an anonymous source IP address, a different country from the true originating country of the connection, etc. In 525, one or more search terms are read and loaded into the program. In some examples, these search terms may be of a form of a word, words or phrase. In one example, as shown in 530, an Internet web browser is started and the program ensures that the processor (or computer) connects to an Internet search engine (or number of search engines) of interest.

In 535, user-defined search terms may be provided, say via the web browser, to the Internet search engine (or number of search engines) and a search requested. The resultant search 'hits' are displayed in 540 by the search engine(s) and read. In 542, a user or subscriber may be provided with an opportunity to enter one or more website(s) and/or a target list that is to be promoted. In 545, the program loads one or more website(s) and a target list that is to be associated with the search terms and that are to be promoted. Thereafter, in 550, the Program reads or extracts those one or more website(s) from the list of search 'hits' provided by the search engine(s) in 540, e.g. the 'hits', that match those provided by the target list.

In 552, the program may optionally generate a link to the one or more of the remaining, or each of the, website(s) using the search engine. For example, in some embodiments, the search engine may generate a list of 'hits' based on the submitted search terms, and from this list the one or more processors may select the hits (e.g. websites) that match the target list. If the target list URL is not on the list of hits from the search engine results we go to it anyway. In some examples, the approach/method taken is to employ the search engine to generate a link to the sites that are selected or provided, per the target list. The search engine, when asked for this link, generates a link that is associated with the submitted one or more search term(s) and includes, for example, the target list URL. Therefore, in this manner, an association is made by the search engine between the search terms, the search process and the target website. The association, and subsequent access of the search engine's link, has a bearing on the target list website's page ranking. Advantageously, the link access is from the search engine and, thus, any analysis of the access is not directly associated with the user/source IP address. In 555, the Internet web browser then reads the target list provided in 550 and accesses one or more of the remaining, or each of the, website(s).

In 560, a log entry may be written to a log file by the program, whereby the log file may contain information about, say, date and time, the search terms and target list and the source IP address used. In some examples, this information may be used for management reporting and analysis, as shown in 565. In 570, the program may determine whether to navigate to the next website and return to 555. In this manner, the program is able to transition 575 through each of the websites defined by the target list. In some examples, this successive transitioning between websites may be continued for a fixed time. In some examples, this successive transitioning between websites may be continued for, say a random period of time. If no more of the identified websites to be accessed exist, in 570, the program exits in 580, closes the web browser and the anonymous Internet connection. The process may then re-start from 515, 520, 525 or 530.

Thus, in a number of applications, the processor engine 105 may, in accordance with examples of the invention, effectively perform a method for affecting a website's (URL) position on a search engine's page ranking. The method comprises loading 525 at least one search term into a program 525; loading 545 a target list comprising at least one website that is to be promoted; creating 520 an Internet connection; requesting a search of the at least one search term on the at least one Internet search engine; identifying at least one website search hit that matches at least one website on the target list; and accessing the identified at least one website a plurality of times, affecting the at least one website's position on the Internet search engine's page ranking.

In this manner, given the automatic nature of the at least one processor's accessing and navigating around one or more websites, no subsequent human intervention is required to affect the website's position on at least one Internet search engine's page ranking. Furthermore, in this manner, by accessing the identified at least one website a plurality of times, flexibility may be provided to enable a decision to be made as to how far up the at least one Internet search engine's page ranking the desired website may appear, for example in the first page or at least in the first two pages. In some examples, the processor may be arranged to intermittently visit the Internet search engine and determine the current page ranking of the desired website in order to identify whether a desired page ranking has been achieved, and if not repeat the process one or more times. In some examples, once a desired page ranking has been achieved, the at least one processor may transition to another search term, a different language of the same search term, a different Internet search engine, another website from the target list, etc.

Thus, in some examples, a method is described that provides a user specified word, words or phrase to a search engine(s), uses a search engine to perform a search, but from the lists of search hits provided by the search engine only selects the 'hits' defined by the user and accesses the match website(s). In one example, the process associates the user specified word, words or phrase with the desired website(s) and therefore increases the website(s) page rank within the search engine making it more visible. In some examples, the accessed website may be navigated for a period of time before the program exits, selects a new IP address and repeats the process.

In some examples, the number of times a website can be visited can be specified once, a pre-determined number of times and/or indefinitely. The user has the option for the website to be visited once only and exit, a given number of times, say 100, and then exit or run continuously until either stopped by the user when the page ranking meets a pre-defined position. In this manner, the user may be provided with an ability, either directly or remotely, say via the smartphone User App, to control or cap a number of times that a website is accessed. Additionally, in this manner, with a user provided with, say, the smartphone User App as well as access to search engines, the user is provided with an ability to control the number of times a website is accessed and therefore a relative order of a plurality of websites within a search engine page ranking, by stopping or starting respective website promotion processes to raise their individual rankings by a desired amount.

Advantageously, in some example embodiments, in contrast to the known current method of associating search terms with a website, and/or modifying the content of the website, and then promoting that website, the present invention does not require modification of the existing website in order to make changes to its ranking. Indeed, aspects of the present invention require no relationship with the website that is to be promoted, which advantageously can be provided in any location on the Internet.

The technical features currently employed by the present invention include a graphical browser. In some examples, the graphical browser may be replaced with a non-graphical text-based web browser.

Figure 6:
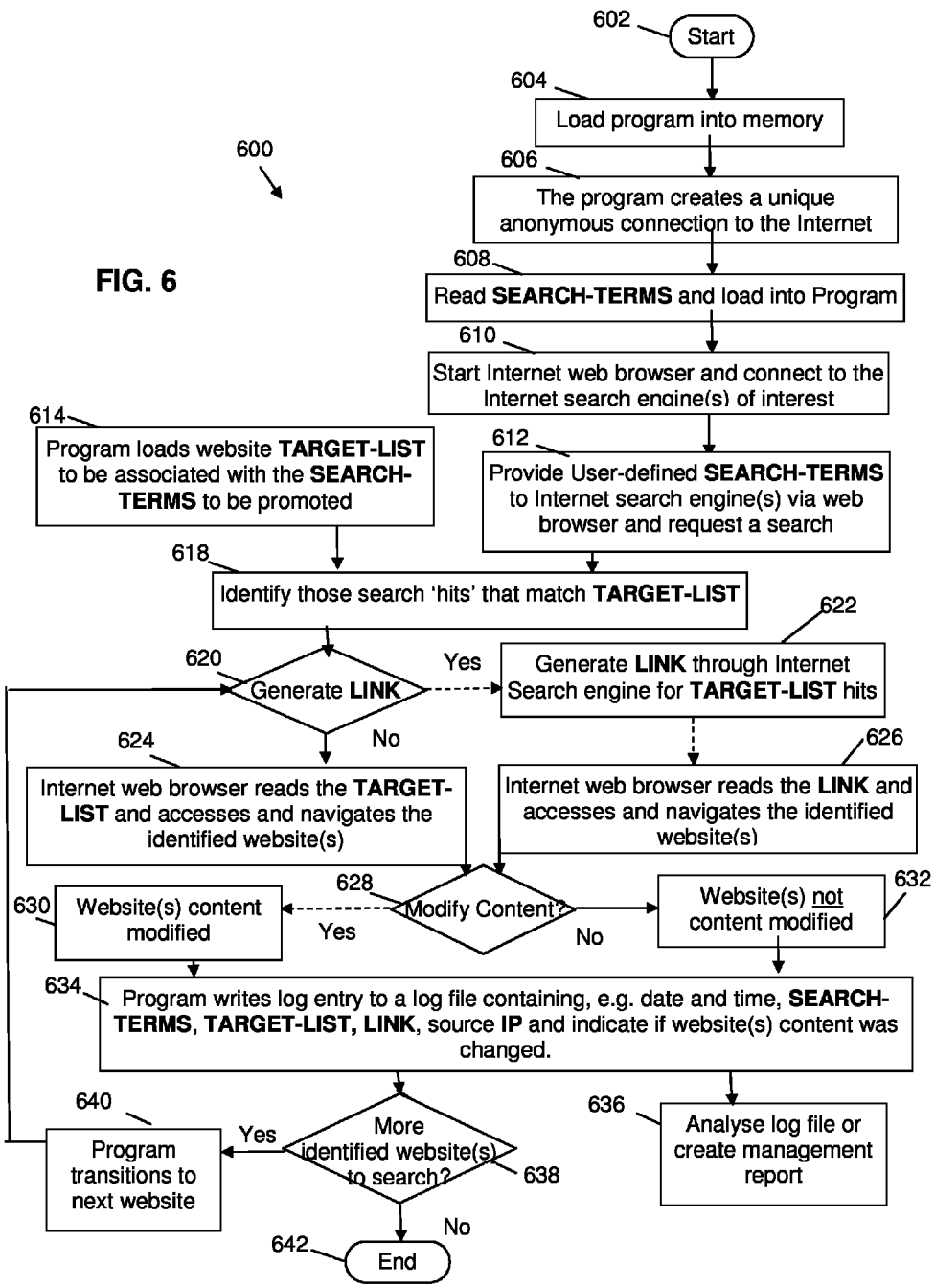
FIG. 6 illustrates a further simplified flowchart of a method for affecting a website's (URL) position on a search engine's page ranking within a processor-based (computer) system.

In some examples of the present invention, as illustrated in the flowchart 600 of FIG. 6, a method for affecting a website's (URL) position on a search engine's page ranking is initiated by running, for example, a software program from the operating system. The method commences in 602, and in 604 the operating system may load a program into a computer memory. In 606, a program stored in a processor or processor engine may be arranged to create a substantially anonymous connection to the Internet. In this context, a processor or processor engine may 'simulate' (inasmuch as it is recognised by an internet search engine) a new individual user clicking on an internet link, using, say, an anonymous source IP address, which may be a different country from the true originating country of the connection, etc. In 608, one or more search terms may be read and loaded into the program. In some examples, these search terms may be of a form of a word, words or phrase. In one example, as shown in 610, an Internet web browser is started and the program ensures that the processor (or processor engine or computer) connects to an Internet search engine (or number of search engines) of interest.

In 612, user-defined search terms may be provided, say via the web browser, to the Internet search engine (or number of search engines) and a search requested. In 614, the program loads one or more website(s) and a target list that is to be associated with the search terms and that are to be promoted. Thereafter, in 618, the Program reads or extracts those one or more website(s) from the list of search 'hits' provided by the search engine(s) in 612, e.g. the 'hits', that match those provided by the target list.

In 620 the program may decide whether or not it is to generate at least one link. If the program decides to generate a link at 620, it may generate this link through the internet search engine 622. In some examples, the processor or processor engine may generate at least one link for target-list hits. Further, in 622, the program may optionally generate a link to the one or more of the remaining, or each of the, website(s) using the search engine. For example, in some embodiments, the search engine may generate a list of 'hits' based on the submitted search terms, and from this list the one or more processors may select the hits (e.g. websites) that match the target list. If the target list URL is not on the list of hits from the search engine results, the program may access this website anyway. In some examples, the approach/method taken may be to employ the search engine to generate a link to the sites that are selected or provided, per the target list. The search engine, when asked for this link, may generate a link that is associated with the submitted one or more search term(s) and includes, for example, the target list URL. Therefore, in this manner, an association may be made by the search engine between the search terms, the search process and the target website. The association, and subsequent access of the search engine's link, may have a bearing on the target list website's page ranking. Advantageously, the link access may be from the search engine and, thus, any analysis of the access is not directly associated with the user/source IP address.

In 626, the program may use the Internet search engine(s) to generate a link and uses this link to access the at least one desired website to be promoted, thus creating an association within the Internet search engine between the search terms which were provided, the link and the at least one desired website to be promoted.

At 620, if the program decides not to generate a link, the internet web browser may read the target-list and access and navigate the identified website(s) directly and access the at least one desired website a plurality of times.

At 628, the processor may receive an input from step 624 and/or 626 and decide whether content of the website needs to be modified. If the program decides that content modification is required, the program, at 630, may modify content of at least one identified website(s). If, however, the program decides not to modify content of at least one identified website, the website content may not be modified, at 632.

In 634, a log entry may be written to a log file by the program, whereby the log file may contain information about, say, date and time, the search terms and target list, the link (if requested), modified content (if modified) and the source IP address used. In some examples, this information may be used for management reporting and analysis, as shown in 636. In 638, the program may determine whether to navigate to the next website and return to 620. In this manner, the program is able to transition 640 through each of the websites defined by the target list. In some examples, this successive transitioning between websites may be continued for a fixed time. In some examples, this successive transitioning between websites may be continued for, say a random period of time. If no more of the identified websites to be accessed exist, in 638, the program exits in 642, closes the web browser and the anonymous Internet connection. The process may then re-start from 604, 606, 608 or 610.

Thus, in a number of applications, the processor engine 105 may, in accordance with examples of the invention, effectively perform a method for affecting a website's (URL) position on a search engine's page ranking. The method comprises loading 608 at least one search term into a program 608; loading 614 a target list comprising at least one website that is to be promoted; creating 610 an Internet connection; requesting 612 a search of the at least one search term on the at least one Internet search engine; identifying 618 at least one website search hit that matches at least one website on the target list; deciding 620 whether to use the internet search engine(s) to generate a link to the at least one website to be promoted; optionally generating 622 a link to the one or more of the remaining, or each of the, website(s) using the internet search engine(s); using 626 the generated link to access the at least one website to be promoted; or optionally not generating 624 a link to the one or more of the remaining, or each of the, website(s) using the internet search engine(s); directly accessing 624 the at least one website to be promoted; and accessing the identified at least one website a plurality of times, affecting the at least one website's position on the Internet search engine's page ranking.

In this manner, given the automatic nature of the at least one processor's accessing and navigating around one or more websites, no subsequent human intervention is required to affect the website's position on at least one Internet search engine's page ranking. Furthermore, in this manner, by accessing the identified at least one website a plurality of times, flexibility may be provided to enable a decision to be made as to how far up the at least one Internet search engine's page ranking the desired website may appear, for example in the first page or at least in the first two pages. In some examples, the processor may be arranged to intermittently visit the Internet search engine and determine the current page ranking of the desired website in order to identify whether a desired page ranking has been achieved, and if not repeat the process one or more times. In some examples, once a desired page ranking has been achieved, the at least one processor may transition to another search term, a different language of the same search term, a different Internet search engine, another website from the target list, etc.

Thus, in some examples, a method is described that provides a user specified word, words or phrase to a search engine(s), uses a search engine to perform a search, but from the lists of search hits provided by the search engine only selects the 'hits' defined by the user and accesses the match website(s). In one example, the process associates the user specified word, words or phrase with the desired website(s) and therefore increases the website(s) page rank within the search engine making it more visible. In some examples, the accessed website may be navigated for a period of time before the program exits, selects a new IP address and repeats the process.

In some examples, the number of times a website can be visited can be specified once, a pre-determined number of times and/or indefinitely. The user has the option for the website to be visited once only and exit, a given number of times, say 100, and then exit or run continuously until either stopped by the user when the page ranking meets a pre-defined position. In this manner, the user may be provided with an ability, either directly or remotely, say via the smartphone User App, to control or cap a number of times that a website is accessed. Additionally, in this manner, with a user provided with, say, the smartphone User App as well as access to search engines, the user is provided with an ability to control the number of times a website is accessed and therefore a relative order of a plurality of websites within a search engine page ranking, by stopping or starting respective website promotion processes to raise their individual rankings by a desired amount.

Advantageously, in some example embodiments, in contrast to the known current method of associating search terms with a website, and/or modifying the content of the website, and then promoting that website, the present invention does not require modification of the existing website in order to make changes to its ranking. Indeed, aspects of the present invention require no relationship with the website that is to be promoted, which advantageously can be provided in any location on the Internet.

The technical features currently employed by the present invention include a graphical browser. In some examples, the graphical browser may be replaced with a non-graphical text-based web browser.

In some examples of the present invention, it may be advantageous to affect search engine prompts, thereby influencing an association created between search terms and the website(s) visited. Prompts allow the user (searcher) to be provided with target web-site options and/or estimated search term completion options whilst typing in their search term(s), e.g. typing in 'Oly' could offer a link to trending 'Olympic games'' news items or an official 'Olympics' movement website or a plethora of unofficial sites mentioning the Olympics. Prompts on an internet search engine browser often allow a short cut access to various desired, proffered, trending (popular) web-sites, before the user is able to complete entering the search term(s). As discussed above, search engines are able to use certain words, parts of words, and phrases, etc. that may be popular, and associate these with websites visited by users using these search terms.

Figure 7:
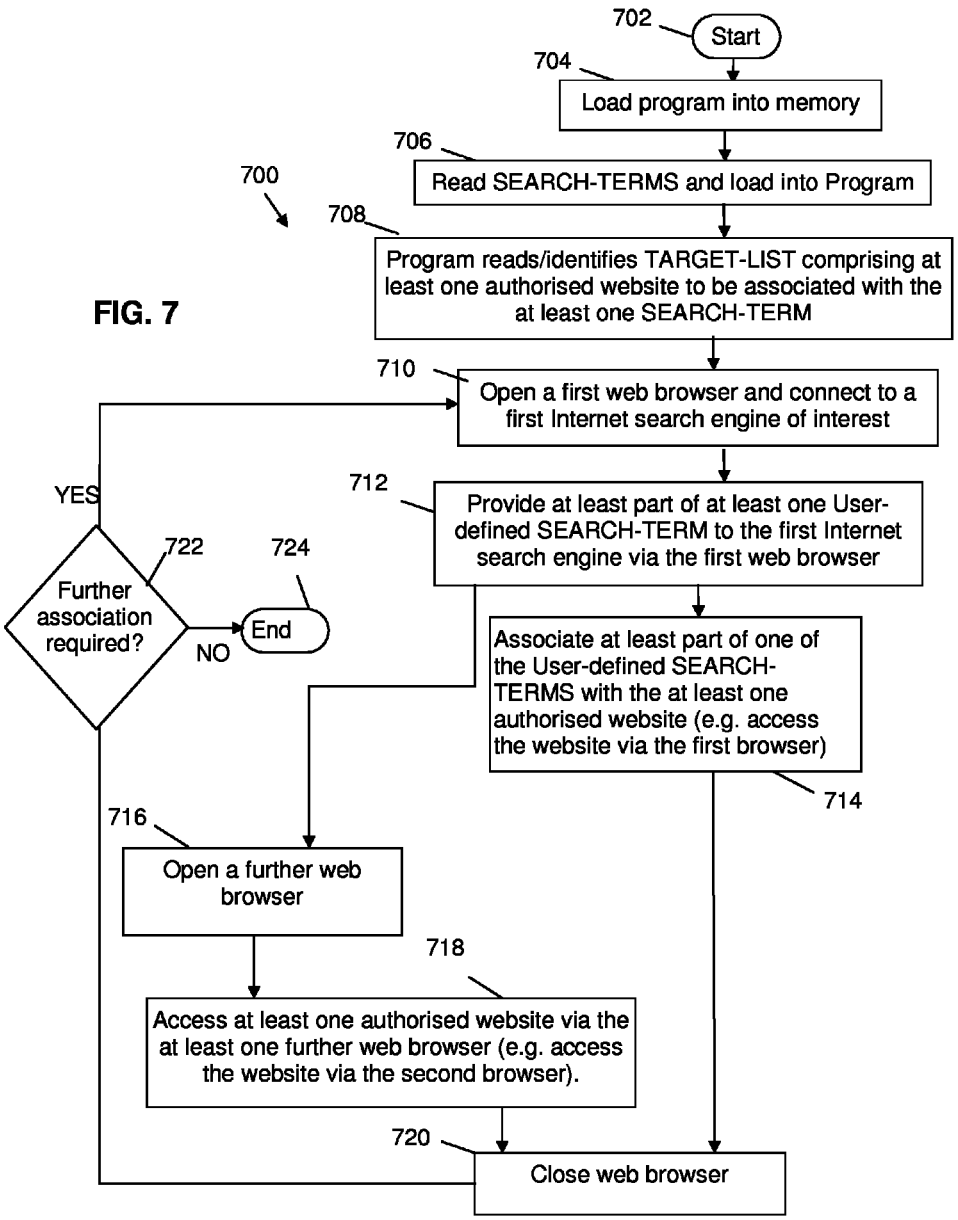
FIG. 7 illustrates a further simplified flowchart of a method for affecting a website's (URL) position on a search engine's page ranking within a processor-based (computer) system.

FIG. 7 illustrates a flowchart 700 of an example method for affecting a website's (URL) position on a search engine's page ranking within a processor-based (computer) system. The method commences in 702, and in 704 the operating system may load a program into a computer memory. In 706, one or more search terms may be read and loaded into the program. In some examples, these search terms may be of a form of a word, words or phrase. In further examples, these search terms may comprise parts of a word, words or phrase, for example, an initial part or parts of a word, words or phrase.

In 708, the processor or processor engine identifies at least one authorised website to be associated with the at least part of the at least one user defined search term. In some examples, a user may provide the target list in 712, for example, detailing a plurality of authorised websites to be associated with at least one search term. In other examples, the processor or processor engine may automatically set-up an individual or plurality of websites to be associated with the at least one search term. In some examples, these set-up websites may direct users, for example via a link, to content in other websites or blogs, for example.

In 710, a first web browser is opened, and a connection is made to a first internet search engine of interest. In one example, the first web browser may be opened via a substantially anonymous connection to the internet. In this context, a processor or processor engine may 'simulate' a new individual user using, for example, an anonymous source IP address. In other examples, the first web browser may be opened by a known source IP address. In 710, the processor or processor engine may provide at least part of the at least one user defined search term to the first internet search engine via the first web browser. In 714, the processor or processor engine may associate the at least part of the user-defined search terms with at least one authorised website via the first internet search engine, for example, by accessing the website via the first web browser. At 720 the processor or processor engine may close the web browser.

In some examples, the processor or processor engine may, in addition to opening a first web browser, open at least one further web browser, as in 716. For example, if a results list from the first internet search engine in 712 is undesirable (or directs the searcher to unauthorised websites), it may be advantageous to associate the at least part of the at least one search term to an authorised website not located on the results list from the first internet search engine.

In 718, the processor or processor engine may access the at least one authorised website via at least one further web browser, thereby creating an association between the at least part of at least one user defined search term with the accessed authorised website using the at least one further web browser, so long as the page opened up for the first internet search engine is not closed. In 720, the processor or processor engine may close the at least one further web browser. In this example, the connection to the first web browser may be maintained until the connection to the further web browser is closed at 720.

At 722, the processor or processor engine may determine whether further association is required. If the processor or processor engine determines that further association is required, the process may loop back to 710. Otherwise the process ends at 724. In some examples, the looped steps may be repeated a plurality of times, thereby affecting the at least one website's position on the internet search engine's page ranking.

Utilising examples of the invention, it may be possible to affect associations between search engine prompts and websites associated with the search engine prompts. As discussed above, search engine prompting provides suggested words or phrases, for example, based on search engine hits using these keywords. Affecting associations between prompts and search engine hits based on these keywords may protect users from damaging content that is intended to damage a user's reputation or business. Examples may include, bogus or fraudulent websites, sites/pages that may contain or facilitate trade secret leaks, counterfeit goods and stolen goods. Further, affecting these associations may protect users from deliberately misleading, defamatory, libellous, malicious, inaccurate, outdated, and unauthorized material. The material in the websites to be affected may be in any form, for example, written, photographic, video, musical or spoken word.

Further, as well as potentially reducing the prominence of damaging content, examples of the invention may be operable to increase the prominence of positive content. Examples may include, associating search engine prompts for advertising or promotional purposes.

Figure 8:
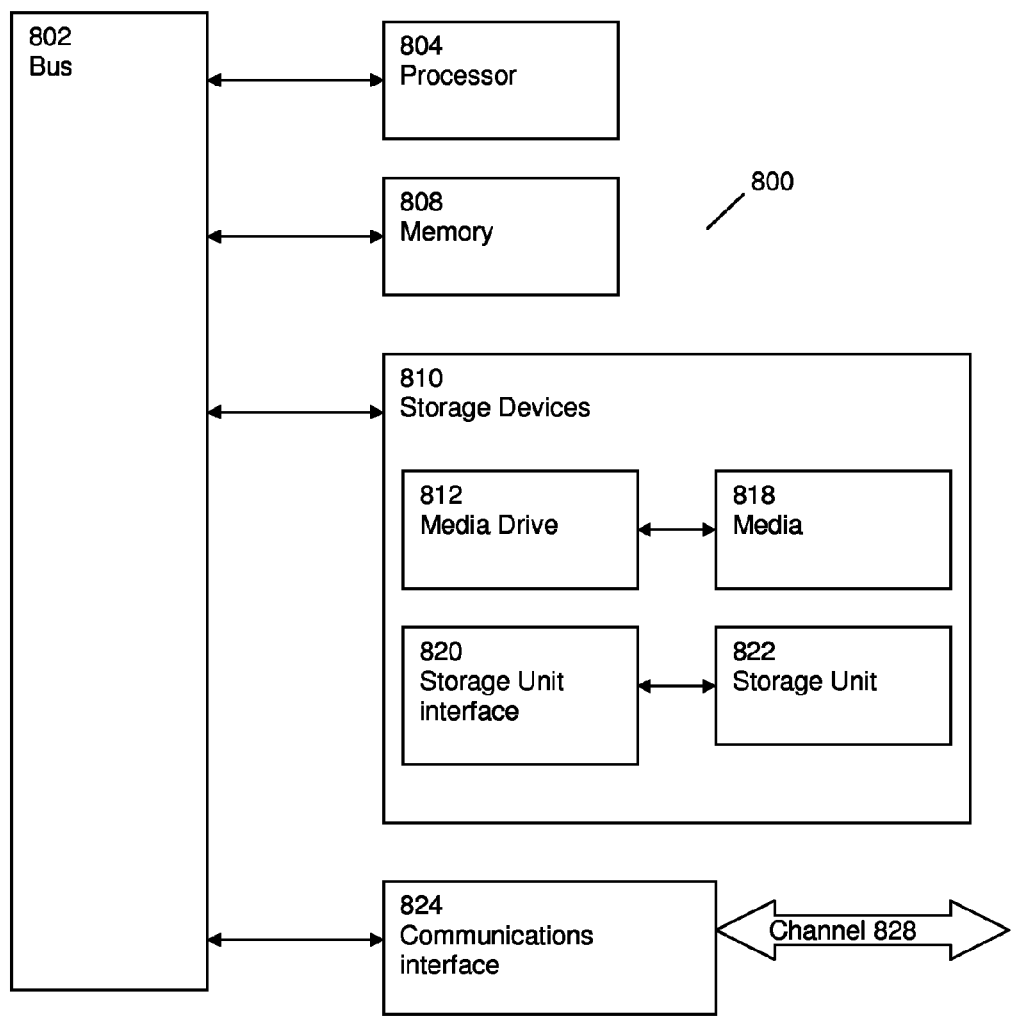
FIG. 8 illustrates a typical computing system that may be employed to implement signal processing functionality in example embodiments.

Referring now to FIG. 8, there is illustrated a typical computing system 800 that may be employed to implement signal processing functionality in embodiments of the invention. Computing systems of this type may be used in wired or wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control module. In this example, processor 504 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or R1), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to tangible media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control module (in this example, software instructions or executable computer program code), when executed by the processor 804, causes the processor 804 to perform the functions of identifying a target list comprising at least one authorised website that is to be promoted; opening a web browser; accessing an internet search engine on the web browser; loading at least a part of at least one search term into the internet search engine running on the web browser; associating at least the part of the at least one search term with the at least one authorised website on the target list; close the web browser, and repeating a plurality of times, the operations of opening, accessing, loading, associating, and closing, thereby affecting the at least one authorised website's position on the internet search engine's page ranking, as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element. For example, in one example, the integrated circuit comprises a processor and at least one input for affecting at least one authorised website's position on at least one internet search engine's page ranking. The processor is arranged to: identify a target list comprising at least one authorised website that is to be promoted; open a web browser; access an internet search engine on the first web browser; load at least a part of at least one search term into the internet search engine running on the web browser; associate at least the part of the at least one search term with the at least one authorised website on the target list; close the web browser, and repeat a plurality of times, the operations of open, access, load, associate, and close, thereby affecting the at least one authorised website's position on the internet search engine's page ranking.

It will be appreciated that, for clarity purposes, the above description has described embodiments of the invention with reference to a single signal processing module. However, the inventive concept may equally be implemented by way of a plurality of different functional units and processors to provide the signal processing functionality. Accordingly, it will be understood that the term 'signal processing module' used herein is intended to encompass one or more signal processing functional units, circuits and/or processors. Thus, references to specific functional units are only to be seen as references to suitable means for providing the described functionality, rather than indicative of a strict logical or physical structure or organization. Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, and as would be appreciated by a skilled person, the order of features in the claims, does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for affecting a website's position on at least one Internet search engine's page ranking have been described, wherein the aforementioned disadvantages with prior art arrangements have been substantially alleviated.

The invention claimed is:

1. A processor engine for affecting at least one authorized website's position on at least one Internet search engine's page ranking; the processor engine comprising at least one processor arranged to:
   identify a target list comprising at least one authorized website that is to be promoted;
   open a web browser session with a web browser application;
   access an internet search engine on the web browser application during the web browser session;
   load at least a part of at least one search term into the internet search engine through the web browser application during the web browser session subsequent to accessing the internet search engine so that the internet search engine generates search results for the at least the part of the at least one search term;
   associate at least the part of the at least one search term with the at least one authorized website on the target list during the web browser session by automatically following a link in the search results for the at least part of the at least one search term with the web browser application to the at least one authorized website on the target list and automatically interact with website content included in the at least one authorized website on the target list through the web browser application without modifying the website content included in the at least one authorized website target list;
   end the web browser session by closing the web browser application, and
   repeat automatically a plurality of times, the operations of open, access, load, associate, automatically interact, and end, thereby affecting the at least one authorized website's position on the internet search engine's page ranking through multiple automatic interactions with the website content.

2. The processor engine according to claim 1, wherein at least one processor being arranged to associate at least the part of the at least one search term with the at least one authorized website on the target list further comprises the at least one processor being arranged to:
   begin a second web browser session by opening a web browser application; and
   accessing at least one further authorized website on the target list during the second web browser session with the web browser application.

3. The processor engine according to claim 1, wherein the at least one processor is further arranged to read the target list and associate at least one further authorized website from one or more remaining, or each of the, authorized website(s) to be promoted.

4. The processor engine according to claim 1, wherein the at least one search term comprises at least one from a group comprising: an user-defined search term, a pre-defined search term, a word, a plurality of words, a phrase, a product, a company name, a person's name.

5. The processor engine according to claim 1, wherein the at least one processor is arranged to create a substantially unique, anonymous connection to the Internet.

6. The processor engine according to claim 1, wherein the at least one processor is arranged to access the identified at least one website a plurality of times during a plurality of separate web browser sessions, by creating a plurality of further connections to the Internet.

7. The processor engine according to claim 6, wherein the at least one processor is arranged to create a plurality of further connections to the Internet using at least one different source internet protocol (IP) address.

8. The processor engine according to claim 7, wherein the at least one different source internet protocol (IP) address comprises a source IP address from a different country.

9. The processor engine according to claim 7, wherein the at least one processor is arranged to request a further search of the at least one search term on the at least one Internet search engine using a different language of the at least one search term.

10. The processor engine according to claim 1, wherein the at least one processor is further arranged to write a log entry into a log file that contains information on at least one from a group comprising: date of searching the at least one website, date of loading the at least one search term; date of access of the at least one website, time of searching the at least one website; the at least one search term, the at least one target list, at least one source internet protocol (I P) address used, a language of the at least one search term, a source IP address country.

11. The processor engine according to claim 1, wherein the at least one processor is confined to perform a search within a specified, region, country or continent.

12. The processor engine according to claim 1, further comprising an anonymous proxy application software module arranged to create an anonymous relay to at least one from a group comprising: the Internet, the at least one Internet search engine, at least one website.

13. The processor engine according to claim 1, wherein the at least one processor is further arranged to navigate automatically around the identified at least one website before exiting.

14. The processor engine according to claim 13, wherein the at least one processor is further arranged to navigate automatically around the identified at least one website for at least one from a group comprising: a set period of time, a random period of time, a search-term dependent period of time.

15. The processor engine according to claim 1, further comprising a user interface operably coupled to the at least one processor to facilitate loading at least one from a group comprising: the at least one search term into the program running on the at least one processor; the target list comprising at least one website that is to be promoted.

16. The processor engine according to claim 15, wherein the user interface comprises at least one from a group comprising: a graphical web browser, a non-graphical text-based web browser.

17. An integrated circuit comprising a processor and at least one input for affecting at least one authorized website's position on at least one internet search engine's page ranking; wherein the processor is arranged to:
   identify a target list comprising at least one authorized website that is to be promoted;
   open a web browser session with a web browser application;
   access an internet search engine on the first web browser application during the web browser session;
   load at least a part of at least one search term into the internet search engine through the web browser application during the web browser session subsequent to accessing the internet search engine so that the internet search engine generates search results for the at least the part of the at least one search term;
   associate at least the part of the at least one search term with the at least one authorized website on the target list during the web browser session by automatically following a link in the search results for the at least part of the at least one search term with the web browser application to the at least one authorized website on the target list and automatically interacting with website content included in the at least one authorized website on the target list through the web browser application without modifying the website content included in the at least one authorized website target list;
   end the web browser session by closing the web browser application, and
   repeat automatically a plurality of times, the operations of open, access, load, associate, automatically interact, and end close, thereby affecting the at least one authorized website's position on the internet search engine's page ranking through multiple automatic interactions with the website content.

18. A method for affecting at least one authorized website's position on at least one Internet search engine's page ranking; the method comprising:
   identifying a target list comprising at least one authorized website that is to be promoted;
   opening a web browser session with a web browser application;
   accessing an internet search engine on the first web browser application during the web browser session;
   loading at least a part of at least one search term into the internet search engine through the web browser application during the web browser session subsequent to accessing the internet search engine so that the internet search engine generates search results for the at least the part of the at least one search term;
   associating at least the part of the at least one search term with the at least one authorized website on the target list during the web browser session by automatically following a link in the search results for the at least part of the at least one search term with the web browser application to the at least one authorized website on the target list and automatically interacting with website content included in the at least one authorized website on the target list through the web browser application without modifying the website content included in the at least one authorized website target list;
   ending the web browser session by closing the web browser application, and
   repeating automatically a plurality of times, the operations of opening, accessing, loading, associating, automatically interacting and ending close, thereby affecting the at least one authorized website's position on the internet search engine's page ranking through multiple automatic interactions with the website content.

* * * * *